United States Patent [19]
Soriano

[11] Patent Number: 5,815,894
[45] Date of Patent: Oct. 6, 1998

[54] SYSTEM FOR HANDLING LONG ITEMS

[76] Inventor: Brian F. Soriano, 50 Penncastle St., Springfield, Mass. 01129

[21] Appl. No.: 653,799

[22] Filed: May 28, 1996

[51] Int. Cl.[6] .............................. A44B 21/00; F16L 3/00
[52] U.S. Cl. ............................... 24/510; 24/297; 24/543
[58] Field of Search ........................ 24/510, 543, 446, 24/457, 908, 3.11, 3.12, 3.13; 43/25, 26

[56] References Cited

U.S. PATENT DOCUMENTS

| | | | |
|---|---|---|---|
| D. 308,290 | 6/1990 | Mulvaney | D3/38 |
| 2,595,230 | 5/1952 | Davlau | 43/26 |
| 3,113,363 | 12/1963 | Fyvie | 24/257 |
| 3,169,290 | 2/1965 | Snodgrass | 24/81 |
| 3,422,500 | 1/1969 | Munse | 24/297 |
| 3,756,550 | 9/1973 | Kollitz | 24/303 |
| 3,992,799 | 11/1976 | Oakes | 43/25 |
| 4,003,612 | 1/1977 | Munsell | 312/245 |
| 4,070,735 | 1/1978 | Canaday | 24/297 |
| 4,424,907 | 1/1984 | Robb | 211/60 R |
| 4,529,112 | 7/1985 | Miller | 224/202 |
| 4,572,416 | 2/1986 | Upham | 224/326 |
| 4,635,886 | 1/1987 | Santucci | 248/73 |
| 4,917,340 | 4/1990 | Juemann et al. | 24/543 |
| 4,959,892 | 10/1990 | Wang | 24/510 |
| 5,039,045 | 8/1991 | Adams | 248/206.2 |
| 5,056,197 | 10/1991 | Cohen | 24/543 |
| 5,071,048 | 12/1991 | Price | 224/207 |
| 5,109,576 | 5/1992 | Teekell et al. | 24/543 |
| 5,115,542 | 5/1992 | Gehres | 24/543 |
| 5,226,892 | 7/1993 | Boswell | 24/543 |
| 5,235,136 | 8/1993 | Santucci | 174/68.3 |
| 5,241,728 | 9/1993 | Hunter | 24/511 |
| 5,363,539 | 11/1994 | Tisol | 24/543 |
| 5,389,082 | 2/1995 | Baugues et al. | 24/543 |

FOREIGN PATENT DOCUMENTS 9603035  2/1996  WIPO .......................... A01K 87/02

*Primary Examiner*—Victor N. Sakran

[57] ABSTRACT

The present invention is directed to a system which facilitates the handling of segments of elongated members in their broken down condition. In particular the application of the invention offers significant advantages of economics, convenience and flexibility for handling fishing poles.

13 Claims, 8 Drawing Sheets

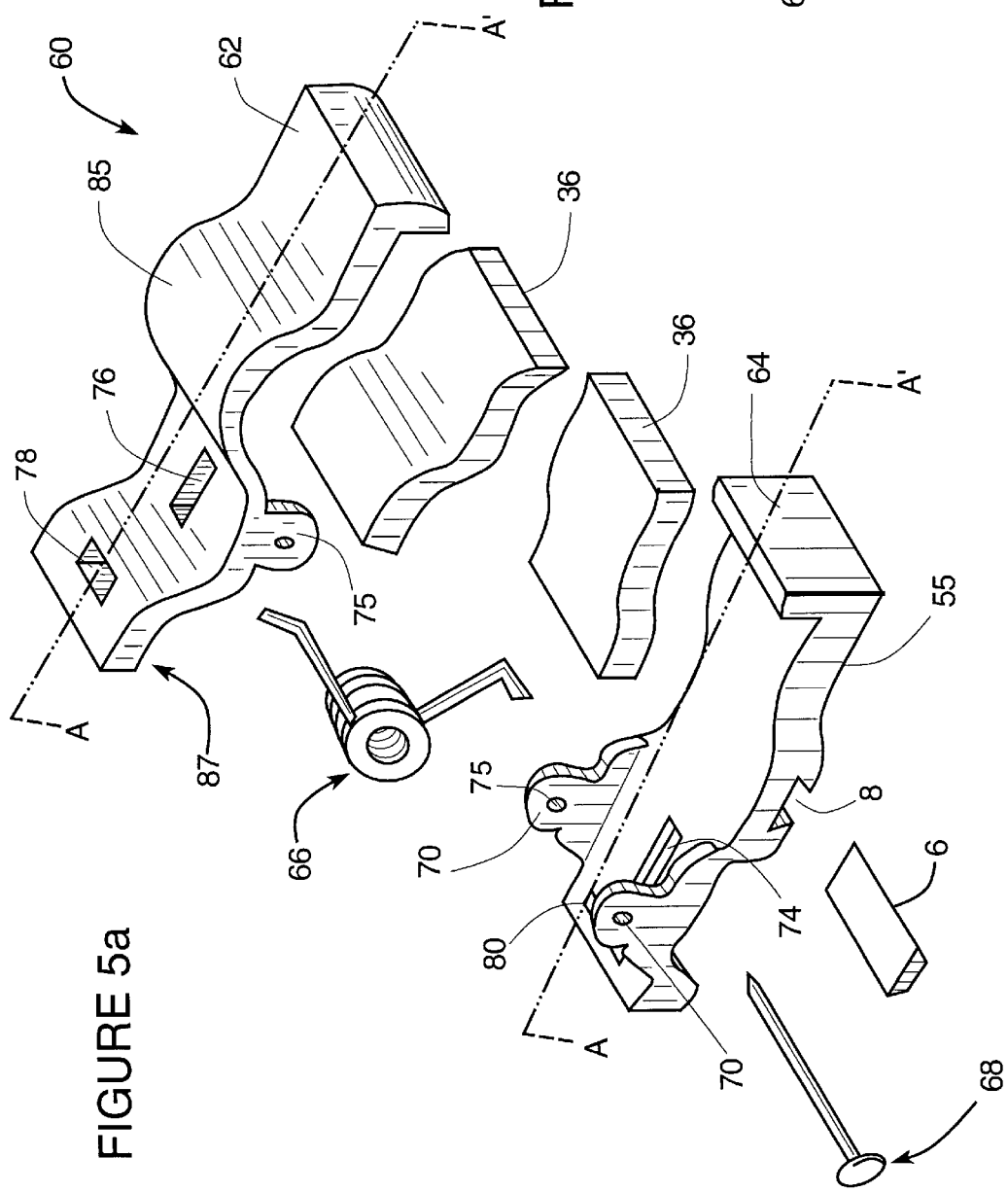

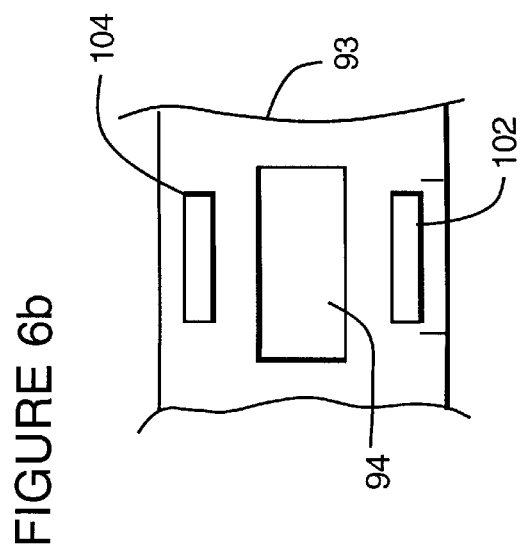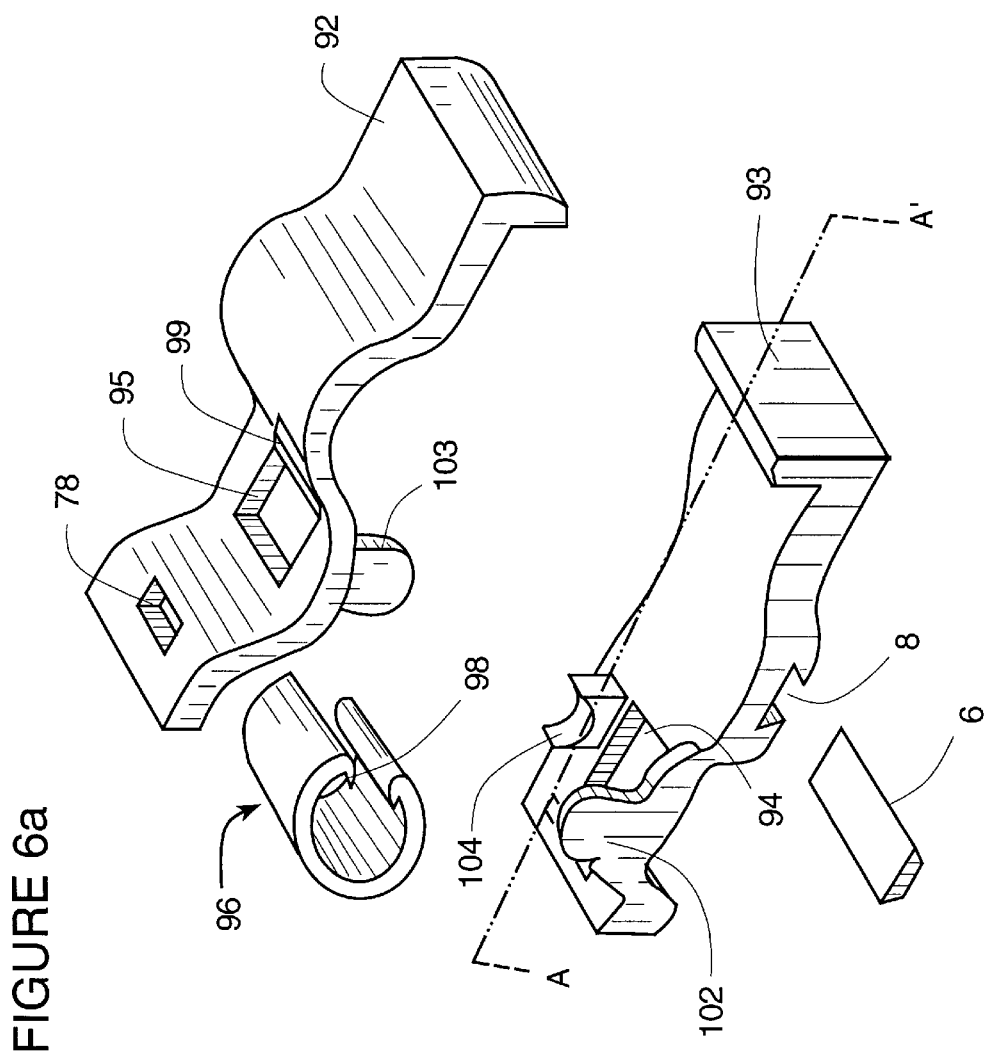

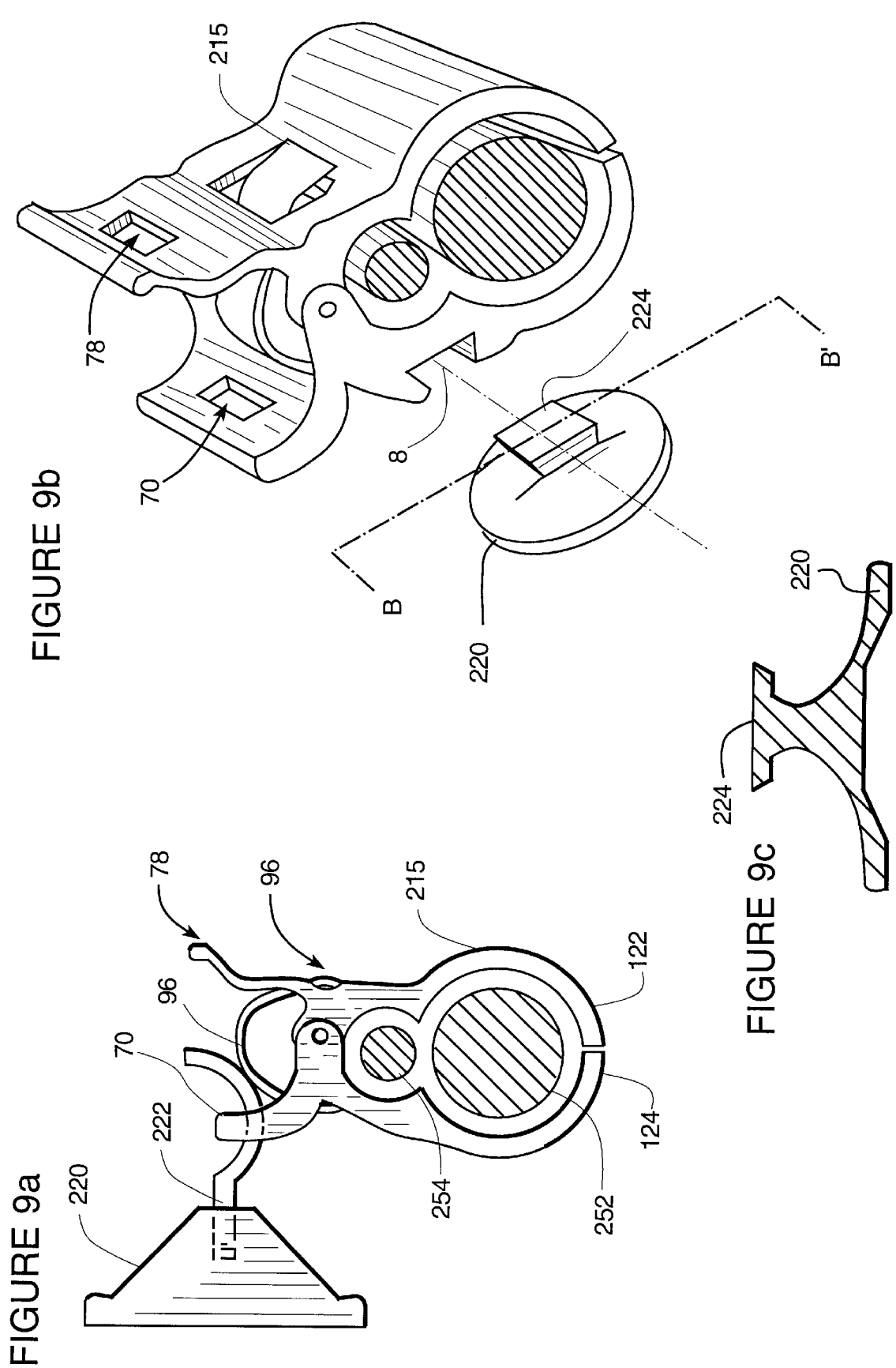

SYSTEM FOR HANDLING LONG ITEMS

FIELD OF INVENTION

The present invention is directed to a system for handling and storing elongated items with emphasis on those with interlocking segments.

BACKGROUND OF THE INVENTION

Holding and transporting elongated items such as poles is facilitated having segments which come apart, telescope within themselves or fold upon themselves. Examples are pointers, measuring devices (as a carpenter's wooden ruler), and fishing poles.

With respect to fishing poles, PCT U.S. Ser. No. 95/09421, by T. Lajoie, incorporated herein by reference, cites a number of patents which hold or otherwise organize rods when disassembled (U.S. Pat. Nos. 3,113,363, 3,169,290, and 3,992,799), and discloses a device for attaching to a rod so as to hold the removed outer segment with the larger inner segment. U.S. Pat. No. 5,071,048 by Price et al. discloses a carrying device using a strap and two plates with holes, while U.S. Pat. No. D308,290 shows a carrier made of a single U-shaped piece.

Combining a means for carrying a rod and reel with a tackle box is disclosed in U.S. Pat. No. 4,529,112 by Miller, incorporated herein by reference, wherein the combination is carried using a shoulder strap. The tackle box is carried on its side when worn over the shoulder. An earlier approach to fastening fishing gear to a tackle box was by leather thongs attached to the box.

Holding detached segments together has been a problem which has been variously addressed. For instance in U.S. Pat. No. 4,572,416 poles are slipped into tubes which are then secured to the top of a vehicle. In U.S. Pat. No. 2,595,230 the tubular container is split lengthwise and mounting clips are provided along the length of the tube so pole members do not slip around and become crossed with one another.

Various clips have been devised for holding things together. In U.S. Pat. No. 3,113,363 a disc-like structure of compliant material with two or more slots to accommodate different diameter of rods is disclosed. U.S. Pat. No. 3,169,290 discloses the use of two or more molded plastic split tubular shaped clamps with springs to hold the split sections together when sections of a fishing pole are placed in them.

The clips of interest to the present the present application were inspired by two areas: fasteners for electrical cable and big spring slips currently popular for bag closures. The former is exemplified by U.S. Pat. Nos. 5,235,136 and 4,635,886, incorporated herein by reference. The latter is exemplified by U.S. Pat. No. 5,241,728, to Hunter, incorporated herein by reference.

Storage of fishing gear present another problem which has been variously addressed. For example U.S. Pat. No. 4,003,612 of Munsell is a vertical rack where reels and rods are separately fastened. A horizontal rack which swings down from a ceiling is disclosed in U.S. Pat. No. 4,424,907 by Robb.

Temporary storage systems have been known to use suction cups. U.S. Pat. No. 5,039,045 discloses one such cup which is clear for use on windows. It lacks an effective means of temporarily attaching other things to it like holders for poles. These and other approaches lack the convenience, portability, and economy of the present invention. Further, they do not adequately deal with holding of tackle included with the rod and reel, nor solve the difficulty of entangling hooks, sinkers etc. during storage and transport. They do not offer an integrated approach to storage in different situations, such as storage at home, storage during transport, storage with the tackle box and storage when not connected to the tackle box.

SUMMARY OF THE INVENTION

The present invention is unique in its adaptation of fastening methods used in unrelated fields; namely, clips for wiring harnesses and raceways.

It is an object of this invention to provide a system useful for holding segments of a fishing pole together.

A further object of the invention is to provide a means for removeably attaching segments to a portable container.

A further object of the invention is to provide a means for removeably attaching segments to a surface as in a motor vehicle for transport.

A further object of the invention is to provide a means for removeably attaching segments to a surface such as a wall for storage.

Another object of the invention is to provide a lightweight, flexible system which is economical and easy to install and use.

These and other objects of the present invention will become more readily appreciated and understood from consideration of a detailed description together with the accompanying drawings of the preferred embodiments.

The present invention, while primarily designed for use with fishing poles, is adaptable to many sizes and shapes of elongated objects.

BRIEF DESCRIPTION OF THE DRAWINGS

FIG. 5a is an exploded perspective view of a second embodiment of a clip and fastener.

FIG. 5b is a partial cross sectional view of the clip shown in FIG. 5a.

FIG. 6a is an exploded perspective view of a third embodiment of a clip and fastener having a different spring arrangement.

FIG. 6b is a partial top view of the lower leg of the clip shown in FIG. 6a.

FIG. 6c is a partial perspective view of the clip shown in FIG. 6a.

FIG. 6d is a partial cross sectional view of the clip shown in FIG. 6a.

FIG. 9a is a side view of the clip and fastener of FIG. 8.

FIG. 9b is a partially exploded perspective view of the clip and fastener of FIG. 9a.

FIG. 9c is a cross sectional detail of the fastener shown in FIG. 8.

DETAILED DESCRIPTION OF THE PREFERRED EMBODIMENTS

The present invention provides a system which facilitates handling of segments of elongated members, particularly in their separated state. Of particular interest is the application of the invention for handling fishing poles.

Figure 1:
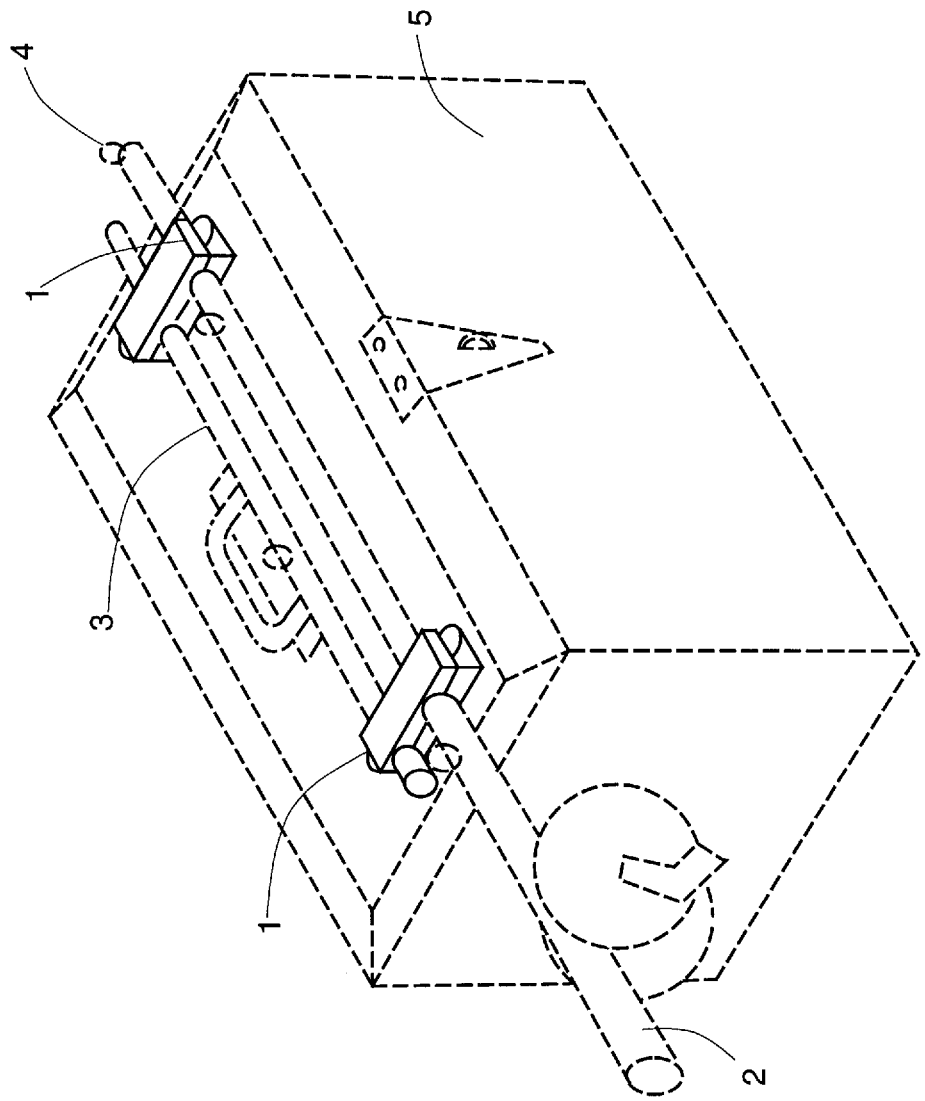
FIG. 1 is a perspective view of a first embodiment of the invention as used to store a fishing pole on a tackle box.

FIG. 1 shows a perspective view of the system with various components. There are two fastened clips (1) which hold a larger (2) and smaller (3) segments of a fishing pole having a line guide (4). The fastened clips (1) are removeably attached to the surface of a storage container (5) such as a tackle box. As explained in more detail below, the system is designed so the fasteners may be released from the container (5) and attached to another surface.

Figure 2:
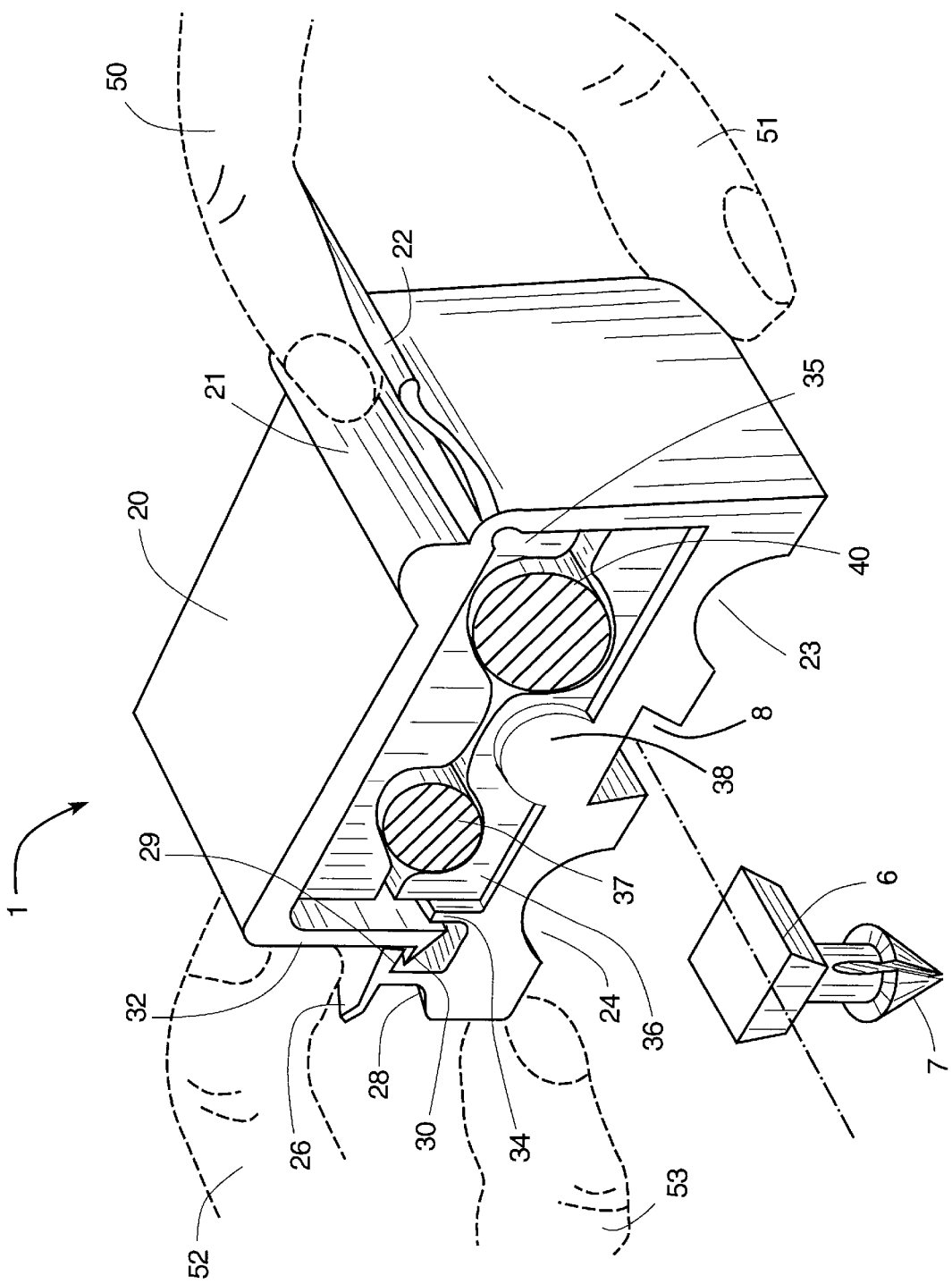
FIG. 2 is a partially exploded perspective view of one embodiment of a clip and fastener.

FIG. 2 is a detailed perspective of one embodiment of the fastened clip (1). This form has a generally rectangular shaped shell (20) having a bump (21) and a tab (22) for a finger (50) to grasp, and an opposing indentation (23) for a second finger or thumb (51) to grasp. This facilitates rotation around a living hinge (35) as a third finger (52) in conjunction with a fourth finger or thumb (53) depress a tab (26) towards an indentation (24) on the bottom so as to bend a vertical member (28) backward to release a catch (30) from under a lip (29) so that endpiece (32) can be raised. An optional riser (34) is included to secure an optional piece of foam (36) in place. Another optional riser (38) serves to separate the smaller (37) from the larger (40) section of the pole. The base of the clip may be attached directly to the surface of the tackle box (5) shown in FIG. 1, or preferably, as shown in this figure, is removeably attachable by one or more devices. In this instance, a push pin (7) is placed into a pre-drilled hole in the surface of the tackle box (5). The top (6) of the push pin (7) has been modified to a trapezoidal shape which fits into a dovetail slot (8) in the base of the clip (1).

Figure 4A:
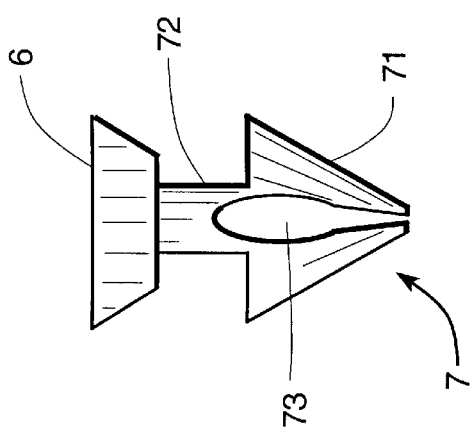
FIGS. 4a and 4b are cross sectional views of two embodiments for attaching the clip of FIG. 3.
Figure 4B:
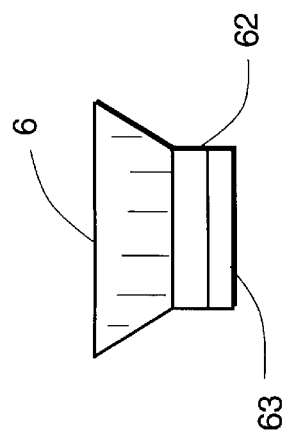
Figure 3:
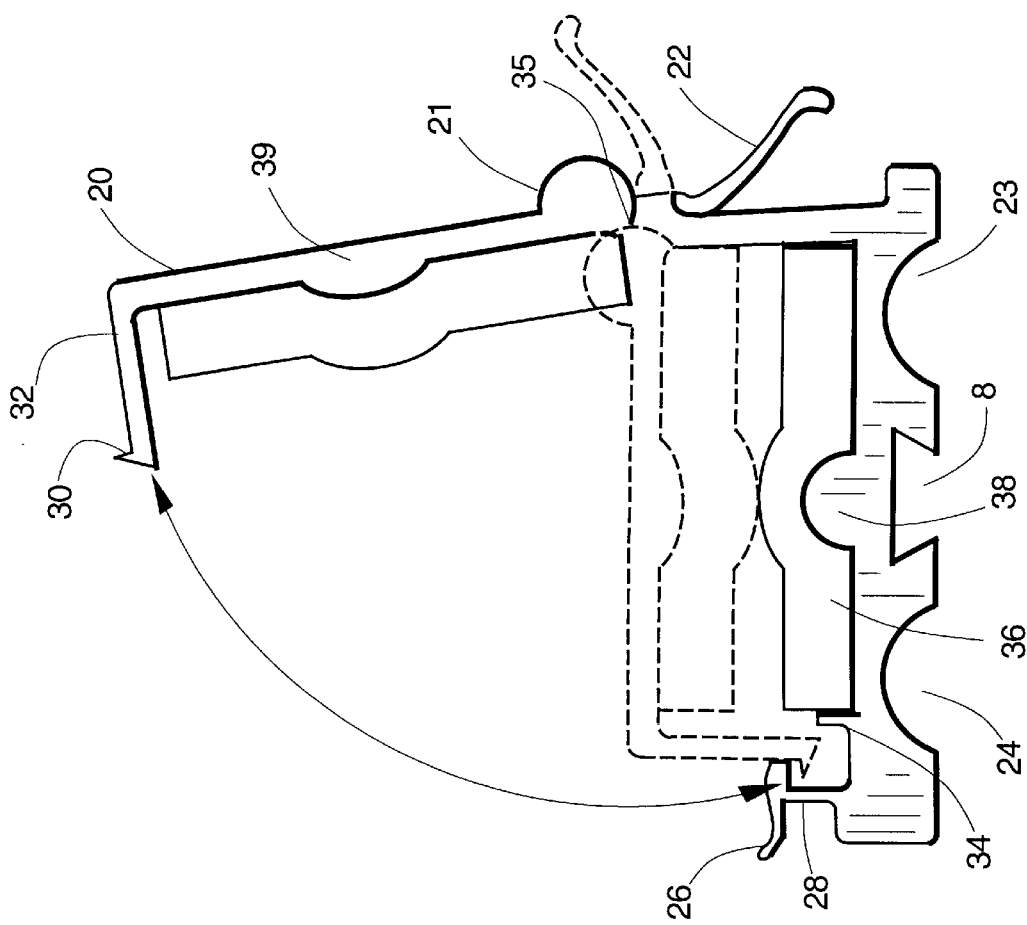
FIG. 3 is a side view of the clip of FIG. 2.

FIG. 3 shows a modified version of the embodiment of FIG. 2 in an opened position. An optional additional bump (39) is shown at the top (20) of the clip opposite the lower bump (38) which augments the separation of pole segments. These bumps (38, 39) would be more pronounced if foam (36) is not used. While foam (36) is used here, any resilient material such as rubber or elastomeric plastics could be used. FIG. 4a shows a first fastener for attaching the clip (1) to a surface. The fastener has a push pin (7) comprised of a conical tip (71) on a shaft (72). A hollowed out portion (73) gives the shaft (72) flexibility to be compressed while forced through a hole having a diameter equal to that of the shaft (72). The top (6) of the push pin has a rectangular upper surface and a trapezoidal cross section so as to mate with the base of the clip (not shown). In FIG. 4b, an alternative means of attaching to the storage container (5) such as a tackle box or other storage surface such as a wall is shown, namely, an adhesive strip (62), typically applied as a double sided adhesive tape with a peelable protective layer (63) provided during shipment. Another means of attachment is to make the push pin integral with the fastener and make the attachment less rigid, so that the fastener may be removed along with the pin each time one wants to remove the pole segments while retaining the capability to hold the pole segments together.

FIG. 5a gives an exploded perspective of a different embodiment of the clip and its components. The clip (60) has a flat base (55) which has a dovetail groove (8) in it to temporarily slip over a mating piece (6) which is permanently fastened to a support surface such as a wall or a tackle box. The fastener has two main pieces, an upper piece (62) and a lower piece (64) which are held together by a torsion spring (66) which is secured about an axis or rotation by a pivot pin (68) which slides through a pair of tabs (70) on the lower piece (64) and the upper piece (62). Each tab is provided with an aperture (75) the diameter of the pivot pin (68). A torsion spring (66) is further secured by passing its two ends through openings (74, 76) in the lower (64) and upper (62) halves respectively, the ends having a bend and right angle protrusion which extends beyond the width of the openings (74, 76). Optional pads (36) are secured to the upper (62) and lower (64) pieces of the clip. The upper half (62) of the fastener is different from the lower half (64) in that it may be curved outward (85) to accommodate a large diameter rod. Also, at the opposite end, the plate (87) is curved upward into and "S" shaped curve to provide a better grip and more travel when depressed to open the jaws of the fastener wider to ease the placement and removal of the larger diameter rod. Openings (80, 78) are also indicated, which are useful for securing to storage devices such as hooks. In FIG. 5b a partial cross sectional view is given for A—A' to further show placement of the spring (66), pivot pin (68) and the way in which the spring passes through the openings (74, 76) in the pieces (62, 64).

Figure 6D:
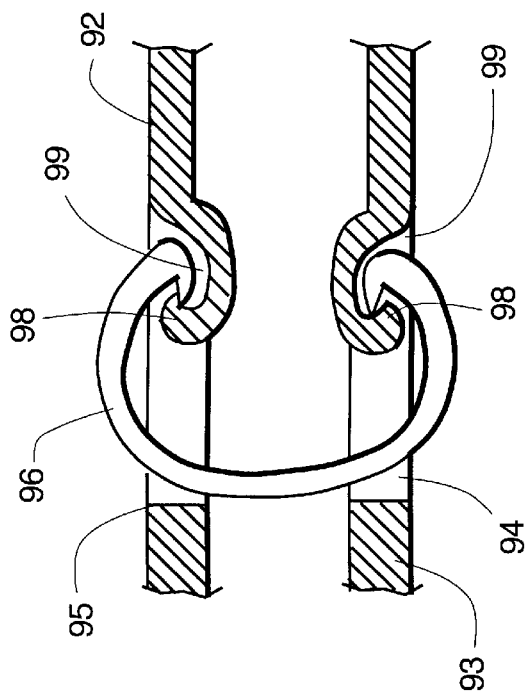
Figure 6C:
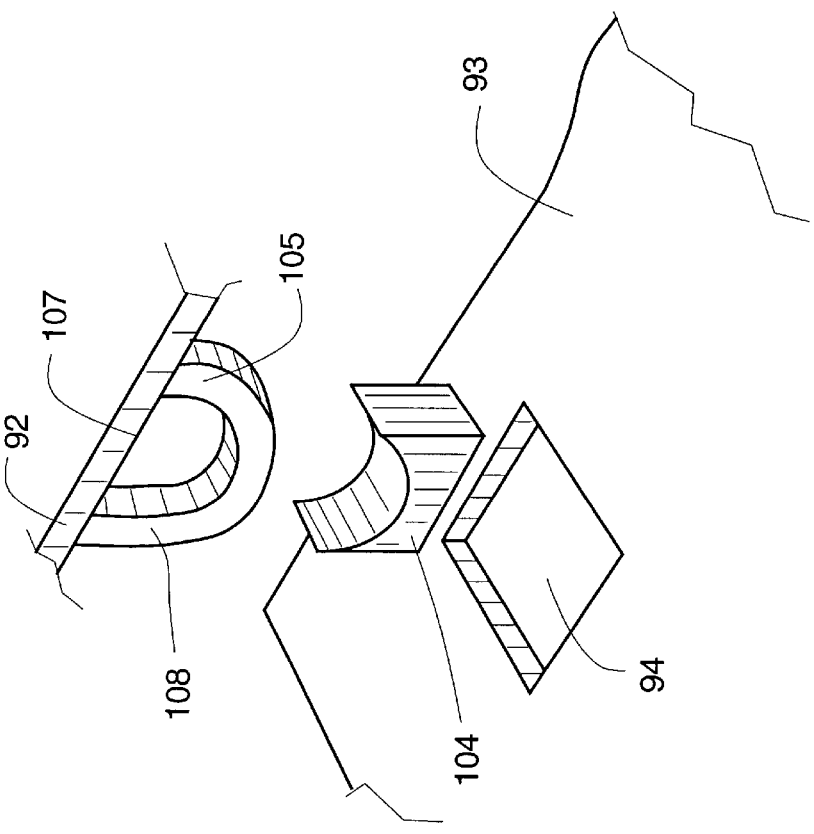

FIG. 6 shows a variation on the embodiment of FIG. 5 in which a different spring arrangement is used. FIG. 6a is a partially exploded perspective view. The clip has two main pieces, an upper (92) and lower (93) which are held together by a clip-like spring (96) which slips through openings (94, 95) and whose shaped ends (98) catch a depression (99) in each of the upper and lower pieces (see FIG. 6d for detail). The fulcrum of the spring fastener in this embodiment is provided by interleaving tabs (102, 104) on the lower (93) half and tabs (103, 105) on the upper (92) half respectively. In FIG. 6b a top view of the lower half (93) is shown of the section having pivot points. Further details of the pivot points are seen in a partial perspective view (FIG. 6c) wherein the tab (105) of the upper piece (92) is comprised of an inner section (107) and larger outer section (108). The inner section (107) is outwardly curved at its outermost region to engage with the concave curvature of the lower tab (104) located on piece (93). On the opposite side for tabs (102) and (103), the situation (not shown) is reversed; namely, tab (102) on the lower part (93) looks like the tab (105) in having two sections and tab (103) looks like tab (104) in having a concave surface which engages the lower convex surface. The function of the larger outer part (108) (and its equivalent on the other piece) is to provide side to side stability.

FIG. 6d is a partial cross section taken at A—A' as seen in FIG. 6a. The clip (96) is seen to protrude through openings (94, 95) of the upper and lower pieces (92, 93) and engage depression (99) in each part in their curved ends (98). The spring clip (96) may be made of metal but is preferably formed from a flexible plastic having strong memory retention.

Figure 7:
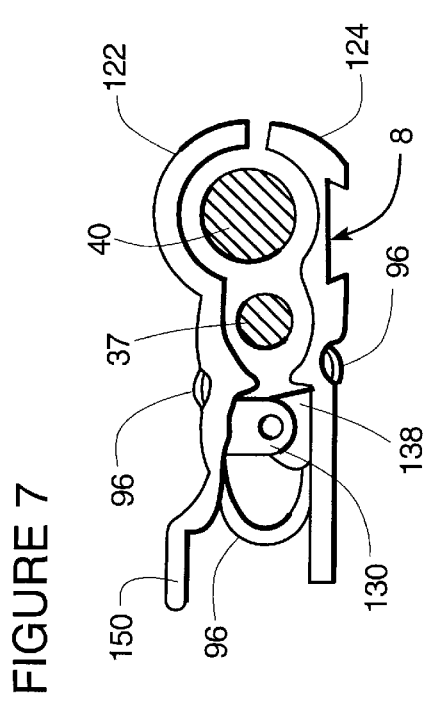
FIG. 7 is a side view of a fourth embodiment of a clip.

FIG. 7 shows a side view of a variation of the embodiment of FIG. 6. The principal difference in functionality is the shaping of the upper (122) and lower (124) parts of the clip so that the small diameter rod section (37) is closer to the fulcrum (130) than the large diameter rod section (40). In principle, this should require less travel when squeezing the end of the plate (150) to release the pole segments. Additional exaggerated contouring of upper and lower parts can be done to hold pole segments at a fixed distance apart in order to prevent the line and the guide (4) from entangling.

Figure 8:
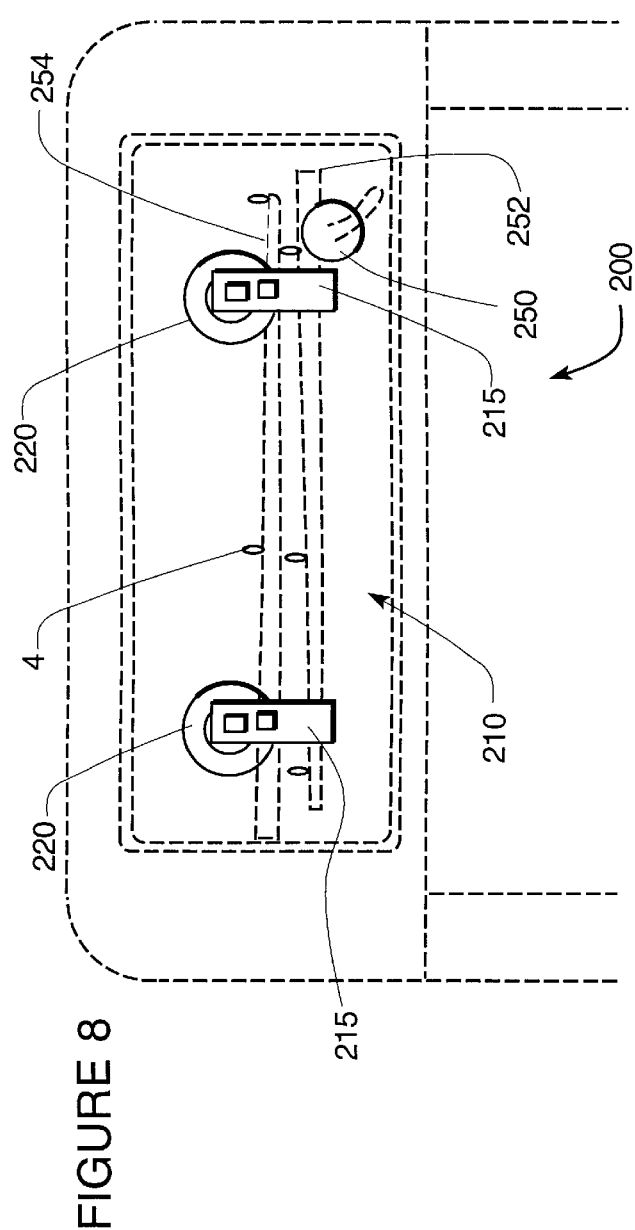
FIG. 8 is a side view of the invention as applied to a rear side window of a vehicle.

FIG. 8 shows the holding system applied to the rear window of a vehicle (200). Suction cups (220), with protruding hooks (222) or other connecting means (224 shown in FIG. 9b) allow temporary attachment of the clips (215) whether by inserting the hook (222) through an aperture (70, 78) of the clip (215) as seen in FIG. 9a, or by a dovetail connection of part (224) with a slot (8) as seen in FIG. 9b. Clips (215) accommodate large diameter (252) and small diameter (254) sections of the pole. While the poles shown have two sections, three or more sections could be easily accommodated by using a resilient pad insert which conformed to the shape and number of the sections. The dimensions of the clip can be scaled to accommodate any size rod.

FIG. 9 provides more detail of the attachment means. In FIG. 9a the clip (215) is seen attached over a hook (222) of the suction cup (220) through an opening (70) in the flat half (124) of the fastener. In FIG. 9b the clip is shown along with modified top (224) to match the size and shape of a dovetail groove (8) in the clip (215). In FIG. 9c, the suction cup (220) with modified top (224) is shown in cross section. This may be formed in a single piece by injection molding with an elastomeric thermoplastic or in two parts by cementing the cap (224) to a commercially available suction cup.

While a suction cup has been described as a fastening method for storage or transport, it is not the intent of the inventor to limit the invention to a particular hook or fastener. For example a magnet with hooks attached would enable one to mount the poles on the side of a truck bed or metal tool box during transport and could be stored by attaching them to a metal pipe or other ferrous surface. Alternatively, a threaded device, preferably self tapping, such as a screw could be used. If the top of the screw is a flat head screw, thus having a taper, the head of the screw could slide into the dovetail groove, and using two screws per clip could prevent rotation. Alternatively, the screw could be inserted through a dovetail shaped strip which interlocks with the dovetail groove.

Appropriate selection of materials for components in the various forms described is an important part of the functionality of the invention. For the clip which attaches to a tackle box, it is important to have a balance between rigidity, ruggedness, flexibility and moldability. Our experience has been that a number of different thermoplastics, thermosetting plastics, rubbers and coated metals meet these requirements. However, among these, the thermoplastics, such as ABS, nylon, polyethylene, and polystyrene are preferred.

Accordingly, the present invention has been described with some degree of particularity directed to preferred embodiments of the present invention. It should be appreciated, though, that the present invention is defined by the following claims construed in light of the prior art so that modifications or changes may be made to preferred embodiments of the present invention without departing from inventive concepts contained herein.

I claim:

1. A device for holding elongated items comprising:

a clip having a first segment pivotally connected to a second segment, said first segment and said second segment defining a gripping space;

means for dividing said gripping space into subspaces; and a holding means for attaching said clip to an item further comprising a resilient pad.

2. The device of claim 1 wherein said means of fastening comprises a magnet.

3. The device of claim 2 wherein said means of fastening further comprises a hook and said first segment is provided with at least one aperture.

4. A device for holding elongated items comprising:

a clip having a first segment pivotally connected to a second segment, said first segment and said second segment defining a gripping space;

means for dividing said gripping space into subspaces; and a fastening means for attaching said clip to an object wherein said fastening means comprises an interlocking joint so that said clip is removeably attachable.

5. The device of claim 4 wherein said joint is a dovetail joint.

6. The device of claim 4 wherein said fastening means further comprises an adhesive pad.

7. The device of claim 4 wherein said fastening means further comprises a threaded fastener.

8. The device of claim 4 wherein said fastener further comprises a push pin.

9. The device of claim 8 wherein said push pin is provided with a compressible section to allow insertion into a reduced diameter.

10. The device of claim 8 wherein a terminal section of said pin is flared.

11. The device of claim 4 wherein said clip further comprises a spring.

12. A device for holding elongated items comprising:

a clip having a first segment pivotally connected to a second segment, said first segment and said second segment defining a gripping space:

means for dividing said gripping space into subspaces; and a fastening means for attaching said clip to an object wherein said means of fastening comprises a suction cup.

13. The device of claim 12 wherein said means of fastening further comprises a hook and said first segment is provided with at least one aperture.

* * * * *